United States Patent [19]

Lascarrou

[11] 4,018,498
[45] Apr. 19, 1977

[54] CONTACT CLAMP

[75] Inventor: Alain Lascarrou, Epinay-sur-Seine, France

[73] Assignee: La Telemecanique Electrique, France

[22] Filed: Dec. 3, 1975

[21] Appl. No.: 637,257

[30] Foreign Application Priority Data

Dec. 17, 1974 France .............................. 74.41481

[52] U.S. Cl. .............................. 339/65; 339/258 P
[51] Int. Cl.² ........................................ H01R 13/12
[58] Field of Search .................. 339/19, 22, 64–66, 339/258, 222; 317/1 D, 1 CB, 120

[56] References Cited

UNITED STATES PATENTS

| 2,719,251 | 9/1955 | Stewart | 317/120 |
| 3,219,887 | 11/1965 | Gerg et al. | 317/120 |

*Primary Examiner*—Joseph H. McGlynn
*Attorney, Agent, or Firm*—William Anthony Druccker

[57] ABSTRACT

The invention relates to a clamp for a movable rack connected to the bus-bars located in a cabinet.

The clamp comprises arms staggered in the direction of the bars permitting the back-to-back plugging in of identical racks on the same of bus-bars.

This construction and arrangement of the clamp is advantageous for power distribution panels.

2 Claims, 3 Drawing Figures

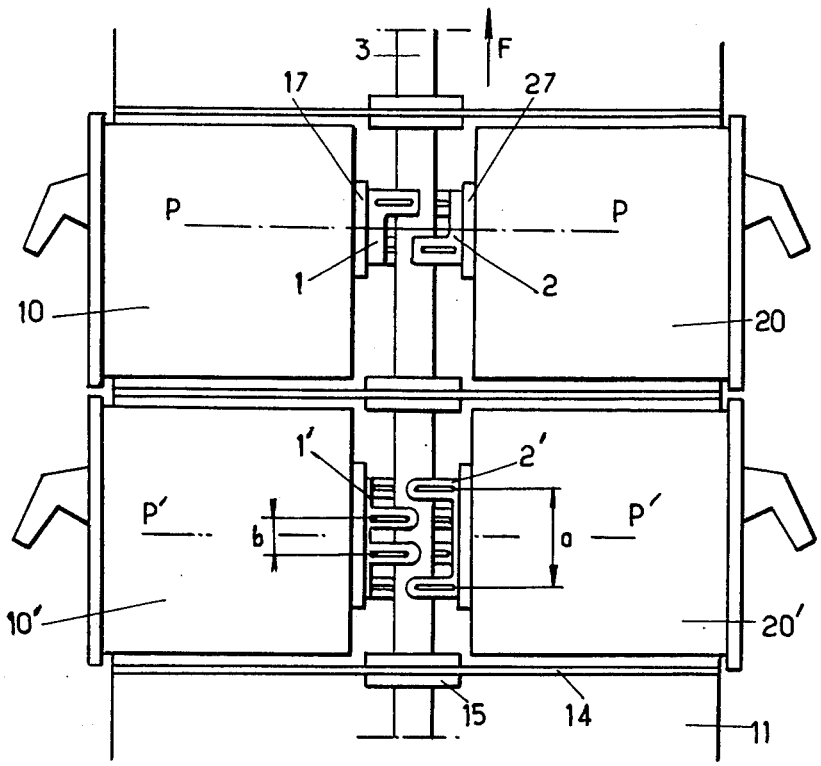
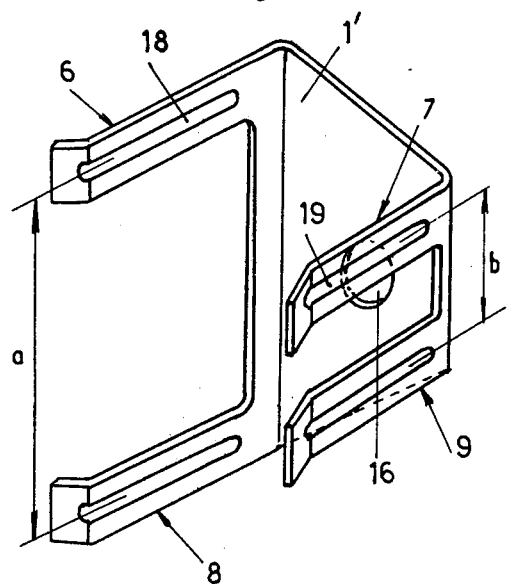
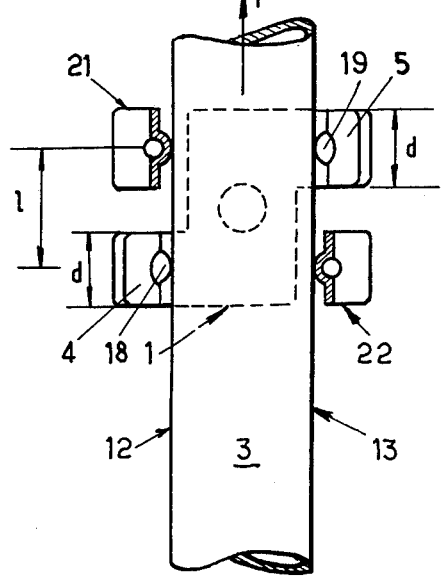

CONTACT CLAMP

The invention relates to contact clamps positioned in the bottom of electrical equipment racks positioned in detachable manner in a cabinet on either side of a set of vertical bus-bars to which they are to be connected, whereby each clamp has two facing arms supported respectively on the two opposite sides of the bar with which it cooperates.

Energy control and distribution systems using racks with clamps of the type described hereinbefore are already known.

In these known systems, the clamps of two opposite racks are placed at different levels to prevent the arms of one clamp encountering the arms of the clamp of the opposite rack. Consequently two opposite racks cannot be identical which on the one hand greatly increases manufacturing costs and on the other an increase in the number of spare racks which must be kept in store in case one of them fails.

Furthermore, the necessity of having to arrange opposite clamps at different levels frequently leads to an increase in the height of the racks, which in turn leads to an exaggerated height of the console where the racks are superimposed. This firstly impairs the mechanical strength of the system, and secondly the overall strength of the bus-bars which is linked with heating caused by the Joule effect. Furthermore, the dangerous mechanical behaviour of very long bus-bars subjected to high electro-dynamic stresses due to possible short circuits must also not be forgotten.

Therefore, the invention proposes to provide clamps whose construction and respective positioning will substantially obviate the above disadvantages and will in particular make possible the fitting of two identical racks on either side of a common set of bus-bars.

According to the invention, this is achieved in that the clamps of two opposite racks are located in one and the same plane P perpendicular to the bus-bars whereby the opposite arms of each clamp are staggered in the direction parallel to the bars by a quantity which exceeds the width of the arm.

The invention will be better understood from reading the following description with reference to the attached drawings, wherein:

FIG. 1 is a sectional view of a cabinet in which are located the racks according to the invention;

FIG. 2 is a perspective view of the clamp;

FIG. 3 is a side view of a bus-bar to which are connected two clamps.

With reference to FIG. 1, the cabinet 11 comprises a certain number of cells vertically separated by shelves such as 14 holding in place by means of insulators 15 a set of vertical bus-bars located in a plane perpendicular to the plane of the drawing.

These shelves can also serve as a support for the superimposed racks 10, 10' whilst other racks 20, 20' are positioned opposite the first racks and symmetrically relative to the set of bus-bars.

One of these bus-bars is designated by the reference numeral 3. Each rack 10, 10', 20, 20' carries a set of clamps integral with insulators such as 17, 27.

In the arrangement proposed by the invention, racks 10, 20 or 10', 20' are identical in such a way that the clamps 1, 2 or 1', 2' carried by the same are located in the same horizontal plane P or P'.

This symmetrical arrangement of the racks does not in itself ensure the possibility of simultaneous connection. Measures must in fact be taken so that the relative arrangement of the flexible arms of the clamps permits such a connection.

The contact clamp 1 shown in side view in FIG. 1 is shown from the front in FIG. 3, where it should be noted that the opposite arms 4 and 5 do not face one another but are staggered in the direction of arrow F which is parallel to one of the arms by a quantity measured by $l$.

If this quantity $l$ is greater than the width $d$ of each arm, it can be seen that it is possible to simultaneously connect an opposite rack carrying the opposite clamp whose arms 21 and 22 are shown in section, whereby the simultaneous connection is shown in the upper part of FIG. 1.

Each contact clamp is preferably formed by cutting and bending a sheet of good conductive material whose elasticity is ensured by elastic members not shown in the drawings. The strength of each arm can be increased by the presence of a longitudinal stamped bead such as 18 or 19.

There is nothing to prevent a clamp comprising two independent arms which are electrically interconnected and separated by a distance equal to $l$. However, this latter variant raises the manufacturing cost.

When there is a high current intensity passing through a rack, it is desired to increase the surface contact between clamp and bus-bar.

The arrangement shown in FIG. 2 which represents an advantageous embodiment of clamp 1' of FIG. 1 simultaneously makes it possible to solve the problem of symmetrical connection and that of the low contact resistance.

The two arms of the clamp are applied to two opposite sides 12, 13 of a bus-bar 3 such as is shown in FIG. 3. It can be fixed to its insulator by an opening such as 16 and is also subject to the action of elastic members.

Two arms 6 and 8 applied to the same side of the bar are separated by a centre-to-centre distance $a$ greater than the centre-to-centre distance $b$ separating the two arms 7 and 9 applied to the opposite side of the bar.

As each pair of neighbouring opposite arms 6, 7 or 8, 9 have the relative dimensions and positionings defined hereinbefore for the two-armed clamp, it can be seen that this embodiment also permits the simultaneous connection of two opposite racks to the same set of bus-bars as shown in the lower part of FIG. 1.

Clamps of the type defined hereinbefore are particularly well-suited to connection to circular bus-bars. However, the measures described hereinbefore are also applicable to bus-bars having a different cross-section.

When a rack initially placed on a particular side of the set of bus-bars is positioned on the other side of the set, the phase sequence is no longer respected so that certain measures must be taken to inform the operator of this change. Among the measures which can be taken and which do not form part of the scope of the present invention, reference can be made to the use of other prevention systems which make it necessary for the operator to perform an internal modification to the connection to permit the complete insertion of the rack, or simply the provision of instructions on the actual cabinet and on the front surface of the rack which must be obeyed and can be obtained by action on the cabling within the rack.

I claim:

1. An electrical distribution board comprising a cabinet, defining a plurality of housing sections, a vertical bus bar structure disposed centrally in said cabinet, said housing sections being disposed in opposed positions on both sides of said bus bar structure, a plurality of electrical units adapted to be positioned in opposed pairs in opposed said sections, each said electrical unit having at least one connector positioned to engage in electrical relationship with said bus bar structure, each connector comprising at least one contact clamp having two opposed arms of the same width measured vertically along the bus bar structure, said arms being adapted to contact respective opposite surfaces of a bus bar, said opposed arms being spaced in the direction of their width dimension by a distance greater than said width.

2. An electrical distribution board, as claimed in claim 1, wherein said contact clamp comprises a first pair of arms adapted to contact a first surface of a bus bar, a second pair of opposed arms adapted to contact a second opposite surface of bus bar, said arms of the first pair being spaced in the direction of their width dimension by a first distance, and said arms of the second pair being spaced in the direction of their width dimension by a second distance greater than said first distance.

* * * * *